United States Patent
Syassen et al.

(10) Patent No.: US 9,694,441 B2
(45) Date of Patent: Jul. 4, 2017

(54) PLANAR STRUCTURE FOR JOINING AT LEAST TWO COMPONENTS

(75) Inventors: Freerk Syassen, Stadland (DE); Yvonne Winkelmann, Bremen (DE)

(73) Assignee: Airbus Operations GmbH, Hamburg (DE)

(*) Notice: Subject to any disclaimer, the term of this patent is extended or adjusted under 35 U.S.C. 154(b) by 1300 days.

(21) Appl. No.: 12/559,904

(22) Filed: Sep. 15, 2009

(65) Prior Publication Data
US 2010/0084072 A1  Apr. 8, 2010

Related U.S. Application Data

(60) Provisional application No. 61/103,785, filed on Oct. 8, 2008.

(51) Int. Cl.
*B32B 7/04* (2006.01)
*B23K 23/00* (2006.01)
(Continued)

(52) U.S. Cl.
CPC ............ *B23K 23/00* (2013.01); *B23K 26/211* (2015.10); *B29C 70/22* (2013.01); *B29C 65/022* (2013.01);
(Continued)

(58) Field of Classification Search
CPC ...... D03D 15/0027; B32B 7/04; B32B 15/02; B32B 2262/12
(Continued)

(56) References Cited

U.S. PATENT DOCUMENTS 4,132,828 A * 1/1979 Nakamura et al. ............ 428/366
4,609,449 A * 9/1986 Morin .......................... 204/206
(Continued)

FOREIGN PATENT DOCUMENTS

| DE | 22 38 688 A | 2/1974 |
| DE | 35 04 861 A1 | 8/1986 |
| DE | 10 2006 057 178 A1 | 6/2008 |

OTHER PUBLICATIONS

German Office Action for Application No. 10 2008 042 662.8 dated Sep. 4, 2012.

*Primary Examiner* — Andrew Piziali

(74) *Attorney, Agent, or Firm* — Jenkins, Wilson, Taylor & Hunt, P.A.

(57) ABSTRACT

The invention relates to a planar structure for joining, in particular for the material-uniting joining, of at least two components. According to the invention, the planar structure is flexible and formed by at least one reaction strand. The reaction strand comprises a preferably cylindrical core, which is provided, at least in some areas, with a coating, which is constructed with a plurality of coaxially applied layers with a small thickness. To produce the layers, two different materials are used, the layers being constructed alternately with one of the two materials. Because of the high degree of flexibility of the reactive planar structure and its arbitrary area extent, components with a complex geometry in the region of the joint faces as well as large-format components can be joined in a material-uniting manner without problems. The reactive planar structure can be produced here using the methods known from textile engineering with virtually any dimensions and, in addition, by a continuous industrial production process. Moreover, the invention relates to a method for providing a material-uniting connection between two components, in particular by means of the planar structure according to the invention.

6 Claims, 2 Drawing Sheets

(51) Int. Cl.
  *B29C 70/22* (2006.01)
  *B23K 26/211* (2014.01)
  *B29C 65/50* (2006.01)
  *B29C 65/00* (2006.01)
  *B29K 101/10* (2006.01)
  *B29K 101/12* (2006.01)
  *B29K 105/06* (2006.01)
  *B29K 305/00* (2006.01)
  *B29K 707/04* (2006.01)
  *B29K 709/08* (2006.01)
  *B29C 65/48* (2006.01)
  *B29C 65/02* (2006.01)
  *B29C 65/10* (2006.01)
  *B29C 65/14* (2006.01)
  *B29C 65/16* (2006.01)
  *B29C 65/06* (2006.01)
  *F16B 11/00* (2006.01)

(52) U.S. Cl.
  CPC ............ *B29C 65/06* (2013.01); *B29C 65/106* (2013.01); *B29C 65/1412* (2013.01); *B29C 65/1425* (2013.01); *B29C 65/16* (2013.01); *B29C 65/4815* (2013.01); *B29C 65/4835* (2013.01); *B29C 65/5014* (2013.01); *B29C 65/5028* (2013.01); *B29C 65/5035* (2013.01); *B29C 66/472* (2013.01); *B29C 66/721* (2013.01); *B29C 66/7212* (2013.01); *B29C 66/7392* (2013.01); *B29C 66/7394* (2013.01); *B29C 66/73941* (2013.01); *B29C 66/742* (2013.01); *B29K 2101/10* (2013.01); *B29K 2101/12* (2013.01); *B29K 2105/06* (2013.01); *B29K 2305/00* (2013.01); *B29K 2707/04* (2013.01); *B29K 2709/08* (2013.01); *F16B 11/006* (2013.01); *Y10T 156/10* (2015.01); *Y10T 428/12535* (2015.01); *Y10T 428/2918* (2015.01); *Y10T 428/2938* (2015.01); *Y10T 442/30* (2015.04); *Y10T 442/40* (2015.04); *Y10T 442/60* (2015.04)

(58) Field of Classification Search
  USPC ....... 442/150, 189, 192, 199, 200, 228, 229, 442/301; 428/367, 378
  See application file for complete search history.

(56) References Cited

U.S. PATENT DOCUMENTS 4,817,853 A * 4/1989 Scanlon et al. ............... 228/121
6,736,942 B2   5/2004 Weihs et al.

* cited by examiner

PLANAR STRUCTURE FOR JOINING AT LEAST TWO COMPONENTS

CROSS-REFERENCE TO RELATED APPLICATIONS

This application claims the benefit of U.S. Provisional Application No. 61/103,785, filed Oct. 8, 2008, the entire disclosure of which is herein incorporated by reference.

FIELD OF THE INVENTION

The invention relates to a planar structure for joining, in particular for the material-uniting joining, of at least two components. Moreover, the invention relates to a method for producing a connection between two components, in particular by means of the planar structure.

Metallic components can be joined in a substance-to-substance bond for example, by soldering or welding, an adequately high temperature being required in the joint region to melt the components at least in some areas or at least to allow a superficial diffusion process. The temperatures necessary for joining may be effected, for example, by chemical reactions, arc discharges, friction or laser beams. In conjunction with this, however, particular difficulties arise in introducing an adequately high amount of heat into large-area joint regions A so-called "nanofoil" is known, for example, from the document U.S. Pat. No. 6,736,942 B2, which is arranged between two components to be joined in a substance-to-substance bond in the joint region or in the component joint. This known nanofoil consists of a plurality of nanolayers stacked one above the other with a material thickness generally of less than 100 nm. Generally, a nanofoil is constructed layer-wise with a plurality of thin nanolayers, which are in each case formed by one of two different metallic material compositions. Two adjacent nanolayers thus in each case have a different composition. Because of the extremely small material thickness of the nanolayers used, an automatic, strongly exothermic chemical reaction can be triggered in the nanofoil by a single external supply of a relatively small amount of initial heat which produces sufficient heat in the region of the component joint for the material-uniting joining of the components. The initial heat required once for ignition is generally introduced into the nanofoil at an outer edge. This may take place, for example, by means of a laser, an electric resistance heater, microwave radiation, infrared radiation, an open flame or another chemical reaction. Once an alignment of the components including the nanofoil arranged in the joint region has taken place, an exothermic reaction is triggered within the nanofoil to complete the technical joining as described above. The nanofoils for thermal joining in this case have the advantage that although a relatively large amount of heat is released, this only takes place over a very short time period and is uniformly distributed over the joint face because of the limited energy density so thermal impairment of the components to be joined is substantially ruled out, whilst a material-uniting, distortion-free connection is nevertheless possible. Because of the limited local introduction of heat, components can be thermally joined even in regions which are otherwise difficult to access.

In addition to high acquisition costs, the disadvantage in the known nanofoils is their limited area extent of a maximum of about 600 $cm^2$ currently, which rules out economic use in the case of relatively large joint faces. Moreover, because of their high degree of brittleness, the application spectrum of the known nanofoils is limited to level joint faces, which tend to be the exception in aircraft construction. As a result of this rigidity or brittleness, gaps produced by joint faces which are not completely flat cannot be bridged by the known nanofoils.

SUMMARY OF THE INVENTION

The object of the invention is therefore to provide an economical reactive planar structure, which can be produced in an easy to manage production process in any dimensions and is also so flexible that use between virtually any curved joint faces is possible.

This object is firstly achieved by a planar structure according to claim 1.

Since the planar structure is flexible and is formed by at least one reaction strand, the planar structure according to the invention can be placed between two components to be joined, it being possible for the component joint or the joint faces of the components to have virtually any curved surface geometry. Moreover, the production of the reactive planar structure from a plurality of reaction strands arranged spatially with respect to one another in a suitable manner allows virtually any area extent, so economical production of the planar structure and, at the same time, efficient further processing, are possible. In addition, a continuous and simultaneously highly-automated production process for the reactive planar structure or the reaction planar structure is achieved by this for the first time and offers further cost-saving potential. Basically, the planar structure according to the invention can be formed by a plurality of standard methods known from textile engineering, for example by weaving, plaiting, interlacing, knitting, crocheting etc., using a reaction strand. Alternatively, the reaction strands may be arranged in a simple two-dimensional placing process in the form of a fabric. A particular advantage of reaction strands compared to conventional reactive nanofoils is the material thickness which is not upwardly limited, so the reaction strands processed for a planar structure can also be used to join components, in which gaps occur in between of up to 1 mm. In the case of nanofoils, the maximum material thickness which can be reached is limited, on the one hand, by the production process and, on the other hand, the brittleness of the plate-like nanofoils limits their processibility. The reaction strands may be part of a conventional reinforcement fibre arrangement and are conventionally used to reinforce a composite component preferably formed by a thermosetting plastics material. An example of this would be the incorporation or the integration of the reaction strands between the reinforcement fibres of a fibre preform to produce a composite component by the RTM process (so-called "resin transfer molding"). The reinforcement fibre arrangements may be produced, for example, with carbon fibres, glass fibres, Aramid® fibres or Kevlar® fibres.

According to an advantageous configuration, the at least one reaction strand has a substantially cylindrical core, which is provided, at least in some areas, with a coating. The cylindrically configured core allows easy further processing of the reaction strand to form a reaction planar structure by a corresponding spatial arrangement of a plurality of reaction strands with respect to one another. A cylindrical core has the advantage, in particular, that processing is possible on conventional standard machines used in the textile industry, which can easily be modified under some circumstances. Basically, the core may have any conceivable cross-sectional geometry and, for example, also have a triangular, square, pentagonal or polygonal cross-sectional geometry. The autoreactivity of the reaction strand is made possible by the thin coating.

According to a further configuration of the planar structure, the coating is formed with at least two coaxially applied thin layers, these layers in each case having a thickness of between 1.0 μm and 0.01 nm and being formed by at least two different materials. As a result of the extremely small material thickness of the layers lying one on top of the other, which are in addition formed by different materials, in particular different metals and/or metal alloys, exothermic chemical reactions, which run automatically once initiation has taken place, can be reliably triggered by the local supply of a specific amount of heat. The reaction enthalpy thus released can be adjusted by the selection of corresponding reaction partners in such a way that the components to be joined melt and/or diffuse into one another in some areas in the region of the reactive planar structure to produce a material-uniting (weld) connection. A material thickness of the individual coaxial layers is preferably in a range between 10 nm and 100 nm. A higher material thickness of the coaxial layers will generally lead to a smaller reaction enthalpy and this may also be advantageous depending on the respective specific application.

A further development of the planar structure provides that an exothermic reaction can be triggered in the coating by the supply of a limited amount of heat to join the two components in a substance-to-substance bond. The external amount of heat required to trigger the exothermic chemical reaction may be locally introduced into the reactive planar structure, for example, by electric heating wires, laser pulses with high energy, electric spark discharges, microwaves, infrared radiation, chemical reactions, open fire or any combination thereof. After the initiation of the exothermic reaction by the supply of a specific amount Q of initialisation heat, this proceeds automatically. For this purpose, a reaction front of the generally strong exothermic reaction spreads, proceeding from the ignition region where the initialisation took place, through to the edge regions of the planar structure. Owing to the exothermic reaction, temperatures of above 1,000° C. generally briefly occur in the joint region between the components to be joined.

A development of the planar structure provides that the core is formed by at least one carbon fibre filament, by at least one glass fibre filament, by a solder, by an additional welding material, by a thermoplastic plastics material or any combination thereof. The core is preferably formed by a material with a melting temperature above the reaction temperature of the reaction strands. As a result the coaxial sheathing of the core and the coating thereof, which contains the chemically effective reaction partners for the exothermic reaction, do indeed react and are thus chemically converted, but the core remains unimpaired. Thus, the remaining core may contribute to additional stabilisation in the joint region between the components. The use of carbon fibre filaments or glass fibre filaments allows, for example, a high degree of flexibility of a planar structure formed therefrom and is moreover advantageous when joining fibre-reinforced plastics materials, as the carbon or glass fibre segments are themselves a part of the fibre reinforcement after the conclusion of the thermal joining process. The use of an additional welding material or a solder above all allows easier thermal joining of metallic components by the reactive planar structure without further additional or auxiliary materials, no the joining process is simplified. If the core is produced with a fusible thermoplastic material, a component produced by a fibre-reinforced thermosetting plastics material may, for example, be joined together with a further metallic component, another fibre-reinforced thermosetting or thermoplastic component or a ceramic component. In this case, the melting temperature of the core should be below a reaction temperature of the reaction strands to maintain the mechanical reinforcement effect thereof after the joining process. Moreover, it is possible to optionally provide an outer face of the reaction strand with a weld addition, a solder, a thermoplastic material or other auxiliary joining materials. As a result, the pre-coating or pre-soldering of the components to be joined is avoided, for example.

Further advantageous configurations of the planar structure are shown in the further claims.

Moreover, the object according to the invention is achieved by a method.

Since the planar structure is firstly arranged, at least in some areas, in a joint region between the components to be joined, and then an exothermic reaction of the planar structure is triggered, two components can be joined thermally or in a substance-to-substance bond preferably over the whole area even at points which are difficult to access, in a simple manner. Furthermore, using this method, large-area components with complex surface geometries can be joined over the whole area with little outlay. Butt friction welding which is in principle comparable in its effect to the method according to the invention with regard to its large-area joint region, is, however, limited to special applications because of the necessary rotational speed of at least one of the two components to be joined.

DETAILED DESCRIPTION OF THE DRAWINGS

Figure 1:
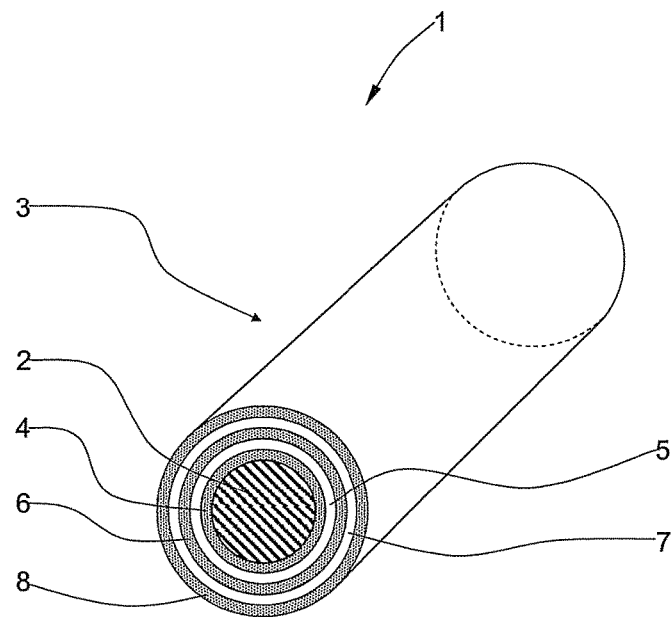
FIG. 1 shows a cross-sectional view of a reaction strand.

FIG. 1 shows a schematic cross-sectional view of a possible structure of a reaction strand. In the embodiment shown, the reaction strand 1 has a substantially cylindrical core 2. The core 2 is completely surrounded by a coating 3, which is formed by five coaxial layers 4 to 8. The layers 4 to 8 each have a small thickness in a range between 1.0 μm and 0.01 nm to allow an exothermic chemical reaction to run automatically within the coating 3 owing to the external supply of a defined amount Q of heat. The layers 4, 6 and 8 are formed by a first material, while the layers 5, 7 are formed by a material which is different from the first. In this connection, respective layers 4 to 8, which are constructed with the different material, adjoin the adjacent layer.

A plurality of materials or material combinations can be considered as suitable materials for the layers 4 to 8. For example, the metals nickel (Ni) and aluminium (Al), titanium (Ti) and aluminium (Al) as well as nickel (Ni) and titanium (Ti) can be used for the layers 4 to 8. Alternatively, the layers 4 to 8 can also be formed by silicon (Si) and carbon (C). The layers 4, 6 and 8 are particularly preferably formed by titanium (Ti) or a titanium alloy, while the layers 5, 7 lying in between are formed by nickel (Ni). The reaction product of these two metals (Ti/Ni) advantageously has a high corrosion resistance. In principle, any conceivable material pairing can be used for the production of the coating 3 which, with a corresponding layer thickness in the nanometer range, allows an automatic exothermic chemical reaction and thus releases an adequate reaction enthalpy for melting two components to be joined. Thus, the temperature which can be achieved by the exothermic reaction must be in the region of the melting temperature of the components to be joined to bring about the desired material-uniting connection at least close to the surface.

The layers 4 to 8 may, for example, be applied by atomic layer deposition to the core 2, for example by means of the known "sputtering method" in a closed container or vessel, which is generally filled with a low-pressure reduction gas, which is partially ionised during the sputtering process. Thus, the particles to be applied are released from a so-called "target" inside the container, ionised, accelerated in an electric field and then centrifuged at high speed onto the core 2 as a substrate, so an extremely thin layer of target material, in general with a material thickness of less than 100 nm, preferably with a layer thickness of less than 10 nm, is deposited on the core 2. The pressure vessel has a volume such that the core 2 can be coated in various sputtering stations inside the vessel alternately, in each case, with one of the two different materials. To store the strand-shaped core 2, a supply reel is present inside the vessel, the core 2 firstly being continuously drawn off from the supply reel and after running through the various sputtering stations inside the pressure container or the completion of the complete sequence of the layers 4 to 8 being wound again onto a further supply reel. After completely running through a theoretically unlimited total length of the core 2, the finished reaction strand 1 provided with the coating 3 can be removed from the vessel. By means of the production method described, the reaction strands can theoretically be produced in one piece in any lengths.

The core 2 of the reaction strand 1 may also be formed by a plurality of materials, which are generally matched to the materials of the components to be joined. The material of the core 2 is preferably such that its melting point is above the temperature produced by the running of the exothermic reaction in the nanomaterial. This produces the advantage, inter alia, that the cores in the joint region between the components simultaneously act as a "fibre reinforcement". Carbon fibre rovings, glass fibre rovings or discrete individual carbon fibres or glass fibres (so-called filaments) are examples of materials which can be used for the core 2. The term "roving" in this context designates a plurality of discrete carbon or glass fibres combined into bundles with a larger diameter. Alternatively, the core 2 may also be formed by a fusible additional welding material or a fusible solder, in order to be able to thermally join, in particular, metallic components without further additional and auxiliary materials, solely using the reaction woven fabric according to the invention. In this constellation, the melting point of the core material is below the temperature released by the running of the exothermic reaction in the coating 3 or the nanomaterial. According to a further variant, the material of the core 2 is an easily fusible thermoplastic plastics material, the melting temperature of which is significantly below a reaction temperature of the layer materials used in the coating 3. As a result, the thermal joining of components becomes possible, of which at least one component is formed by a fibre-reinforced thermosetting plastics material. To further improve the quality of a joint of this type, it may be advantageous to optionally additionally provide the joint region of the component formed by a fibre-reinforced thermosetting plastics material, at least in some areas, with a layer of a thermoplastic plastics material. The material used for layer formation preferably corresponds to the thermoplastic core material in this case.

Figure 2:
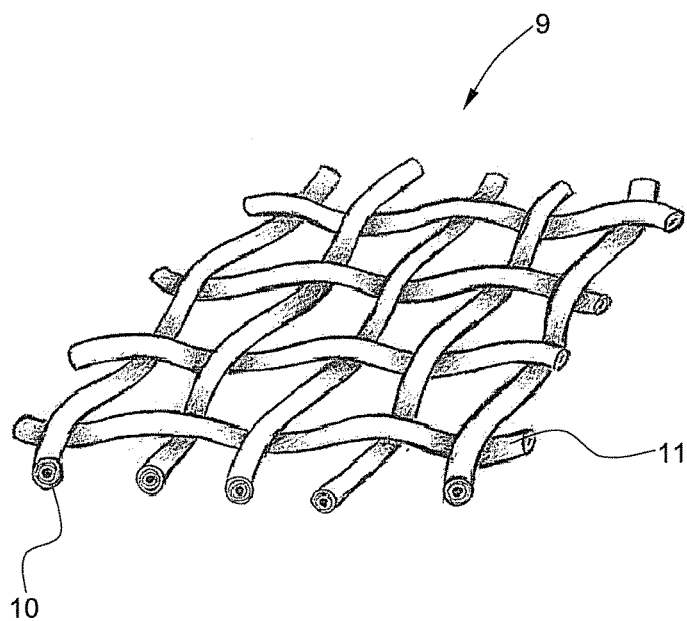
FIG. 2 shows a view, by way of example, of a planar structure produced according to the invention with a plurality of reaction strands by weaving.

FIG. 2 shows a perspective view of the construction in principle of the planar structure according to the invention. A reactive planar structure 9 is formed by weaving by a plurality of flexibly configured reaction strands according to the invention, of which one (warp) reaction strand 10 and one (weft) reaction strand 11 are representatively provided with a reference numeral in each case for all the others. The structure of the reaction strands 10, 11 used to form the planar structure 9 corresponds to the structure of the reaction strand 1 described in FIG. 1. The two reaction strands 10, 11 may also be integrated into reinforcement fibre arrangements conventionally used to reinforce composite materials, for example carbon fibre fabric, carbon fibre woven fabric, force flow-optimised carbon fibre arrangements or the like. This variant of the planar structure 9 is advantageous when fibre-reinforced thermosetting or thermoplastic composite materials are to be joined, as the planar structure 9 is then itself a part of the fibre reinforcement of the joined components. Moreover, with a reactive reinforcement fibre arrangement equipped in this manner, composite components can be directly produced by known production methods (for example TFP deposition methods, RTM methods, hand lamination methods), which then automatically harden by the ignition of the integrated reactive reinforcement fibre strands, so the use of expensive autoclaves, large-format vacuum bags, furnaces or other heating devices for hardening can be dispensed with. By means of such auto-hardening components, the production outlay for components made of fibre-reinforced plastics materials can be substantially reduced. Owing to the weaving of the reaction strands 10, 11, the planar structure 9 can be produced in virtually any area dimensions and, in addition, continuously in a simple industrial standard process. Conventional devices in the textile industry for weaving etc. can generally be used to weave the individual reaction strands, because of their flexibility and cylindrical cross-sectional geometry. The reactive planar structure 9 may also be arranged, because of its high degree of flexibility, between curved joint faces of components, which frequently occur in aircraft construction. Alternatively, it is possible to place the reaction strands 10, 11 spatially in position relative to one another by other methods. Interlacing, knitting and plaiting are mentioned by way of example in this context. Basically, the reaction strands 10, 11, may also be arranged one above the other in the form of a fabric, in other words in a two-dimensional depositing process, with the reaction strands not leaving their laying plane. In order to prevent undesired position changes in the laid reaction strands in the fabric, it is generally, however, necessary to additionally secure the reaction strands, for example by sewing with thermoplastic auxiliary threads (for example Aramid® threads).

Figure 3:
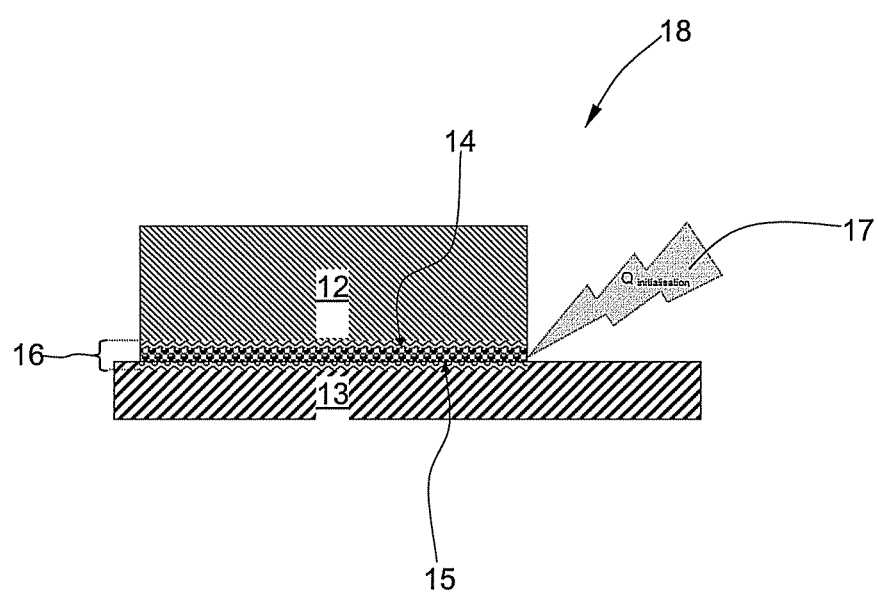
FIG. 3 shows a schematic view of the sequence of the method.

FIG. 3 is a schematic view of a sequence, by way of example, of the method according to the invention for the material-uniting joining of components by means of the reactive planar structure according to the invention. In the view of FIG. 3, a first component 12 and a second component 13 are positioned in relation to one another, in other words aligned. The reactive planar structure 9 is located between the joint faces 14, 15 (shown level for simplicity) of the components 12, 13. The flexibility of the planar structure 9 also allows its use in the case of curved joint faces, it being possible to simultaneously even out relatively small irregularities, in other words, in particular deviations of the surface geometry of the two joint faces 14, 15 from a predetermined desired surface geometry, because of the flexibility. The local supply of a defined amount 17 of heat from the outside triggers the exothermic reaction inside the reactive planar structure 9 and a material-uniting connection is formed virtually over the whole area in the joint region 16 between the components 12, 13. This connection may take place by diffusion and/or melt processes and mixing processes caused thereby. In the joint region 16 between the components 12, 13, this leads to an at least partial melting in the surface region and consequently to a limited material mixing of the materials of the two components 12, 13, as indicated by the wavy lines as a filling pattern of the joint region 16, or in the case of relatively low temperatures, to diffusion processes of the materials involved close to the surface. After the cooling of the two components 12, 13, the joining process is ended and a material-uniting connection 18 is produced between the components 12, 13.

The components 12, 13, may be formed by virtually any metallic or, under some circumstances, non-metallic, materials or material compositions or substances. For example, components made of aluminium alloys, high-grade steel alloys and titanium alloys may be joined without problems. It is likewise possible to join ceramic components to one another or to metallic components. It may be necessary here to use a suitable additional welding material for the core 2 of the reaction strand 1 used. Moreover, components 12, 13, which are formed by fibre-reinforced plastics materials, can also be joined together by the use of the reactive planar structure 9. In the case of thermosetting composite materials, at least the core 2 should be formed by a fusible thermoplastic material to reliably allow a material-uniting connection. To improve the joint quality, it may moreover be necessary to coat at least one thermosetting joining partner with a thermoplastic plastics material. In the same manner, it is possible to join thermosetting composite materials by means of the planar structure 9 to metallic components or non-metallic components.

Regardless of this, the reactive planar structure 9 according to the invention can be advantageously used to harden large-format fibre-reinforced, thermosetting components. Furthermore, an application is possible in the area of so-called "rapid prototyping" or "additive layer manufacturing", in which complex three-dimensional structures are formed by the layer-wise application of a hardenable plastics material to a base body. In order to allow the production of a prototype within a reasonable amount of time, a forced hardening has to take place, which may advantageously take place by means of embedded reaction strands 1, 10, 11 or reactive planar structures 9.

Large-format components may also be produced directly with the reactive planar structures—as in the "rapid prototyping" method or the "additive layer manufacturing" process. A compact component can be joined by a multi-layer structure with reaction planar structures and subsequent ignition of the reaction planar structure. If recesses are introduced beforehand into the individual layers of the reaction planar structure by punching, cutting, drilling or similar methods, complex three-dimensional components can also be produced by the layering of a plurality of reaction planar structures one above the other. In this manner, materials or components can be produced which consist of mixed materials. For example, the production of sheet metal components or metal sheets, which consist of a material mix, such as, for example, Ni—Ti and CFK, would be conceivable.

LIST OF REFERENCE NUMERALS

1 reaction strand
2 core
3 coating (core)
4 layer
5 layer
6 layer
7 layer
8 layer
9 reactive planar structure (woven reaction planar structure)
10 reaction strand (warp direction)
11 reaction strand (weft direction)
12 first component
13 second component
14 joint face (first component)
15 joint face (second component)
16 joint region
17 amount of heat ($Q_{initialisation}$)
18 material-uniting connection

The invention claimed is:

1. A joint arrangement of a first component and a second component of an aircraft or spacecraft having curved joint faces, comprising:
   a first component having a curved joint face;
   a second component having a curved joint face, the joint face of the first component and the joint face of the second component being arranged adjacent to each other; and
   a planar structure for the material-uniting joining of the first component and the second component arranged between the joint face of the first component and the joint face of the second component,
   wherein the planar structure is adapted for use between curved joint faces and is formed by at least a first reaction strand and a second reaction strand, the first reaction strand and the second reaction strand being woven, interlaced, knitted or spatially arranged by any combination thereof, wherein the first and second reaction strands have a substantially cylindrical core respectively, which is provided, at least in some areas, with a coating and wherein an exothermic reaction can be triggered in the coating by a supply of heat, to join the first component and second component by a substance-to-substance bond, the first component and the second component being adapted to at least partially melt and to a limited extent mix their materials in the surface region, wherein the coating is formed by at least five coaxially applied thin layers, a first, third and fifth layer being formed by titanium and a second and fourth layer being formed by nickel, the first layer being arranged on the substantially cylindrical core, the second layer being arranged on the first layer, the third layer being arranged on the second layer, the fourth layer being arranged on the third layer and the fifth layer being arranged on the fourth layer.

2. The joint arrangement according to claim 1, wherein the at least two layers each have a thickness of between 1.0 µm and 0.01 nm.

3. The joint arrangement according to claim 1, wherein the core is formed by one carbon fibre filament.

4. The joint arrangement according to claim 1, wherein at least one component is formed by a metallic material, formed by an aluminum alloy.

5. The joint arrangement according to claim 1, wherein at least one component is formed by a non-metallic material, formed by a fibre-reinforced plastics material.

6. The joint arrangement according to claim 1, wherein the planar structure is configured as a reinforcement fibre arrangement, wherein the reinforcement fibre arrangement is formed by a plurality of spatially arranged reinforcement fibres.

* * * * *